Aug. 19, 1958  A. J. WARSAW  2,848,086
POWER TAKE-OFF AND TRACTOR DRIVE MECHANISM
Filed Jan. 13, 1953  3 Sheets-Sheet 1
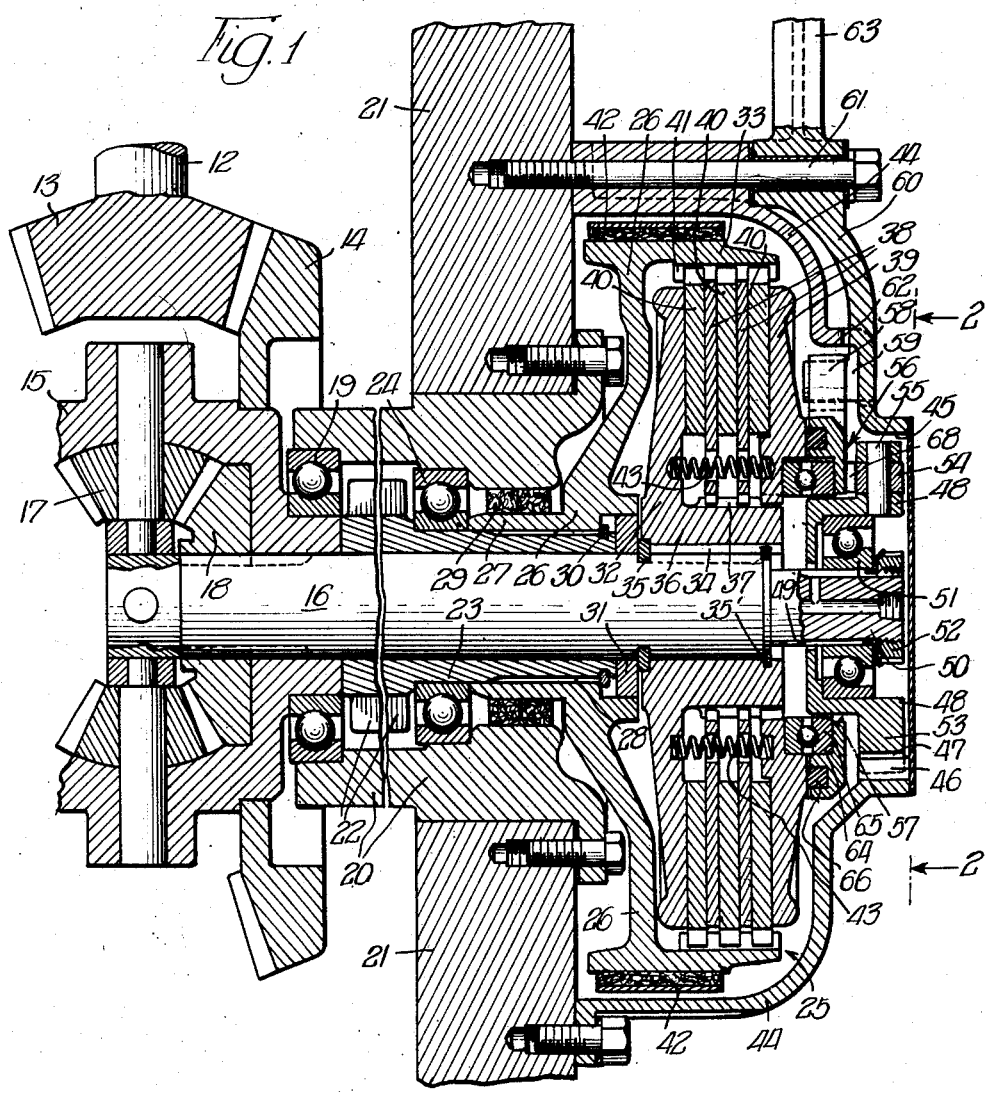
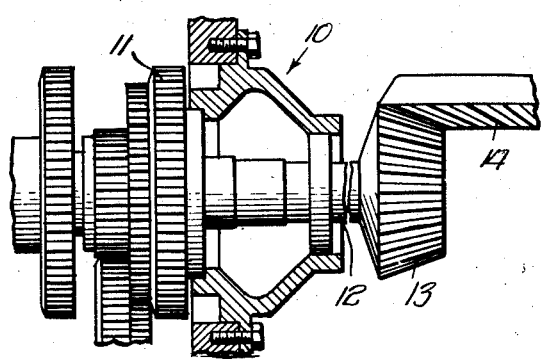
INVENTOR.
Arthur J. Warsaw,
BY
Cromwell, Greist + Warden
attys.

Aug. 19, 1958     A. J. WARSAW     2,848,086
POWER TAKE-OFF AND TRACTOR DRIVE MECHANISM
Filed Jan. 13, 1953     3 Sheets-Sheet 2
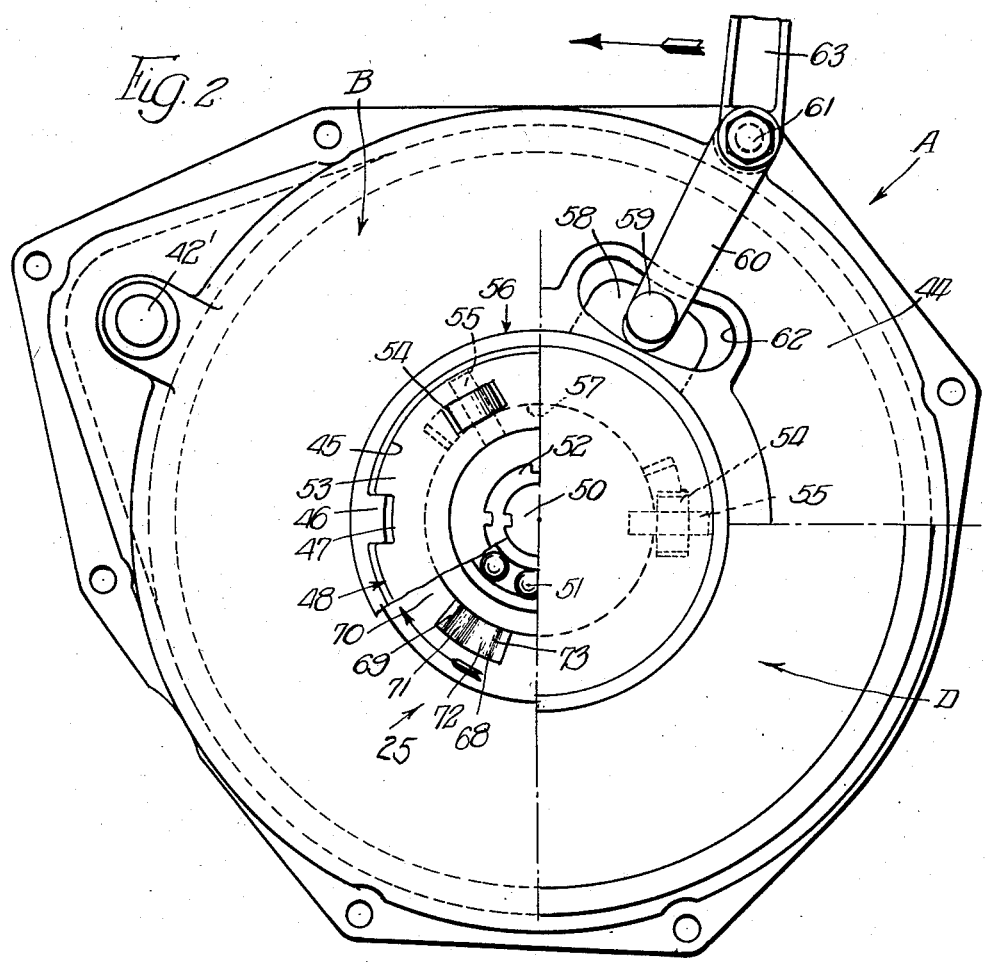
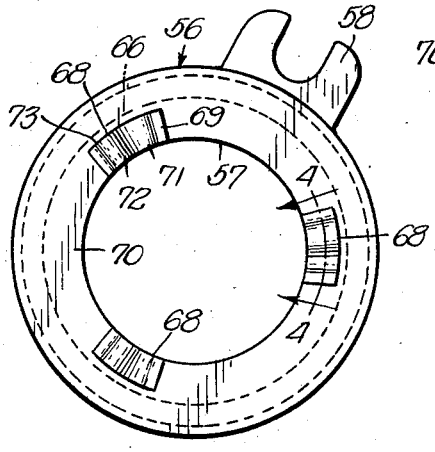
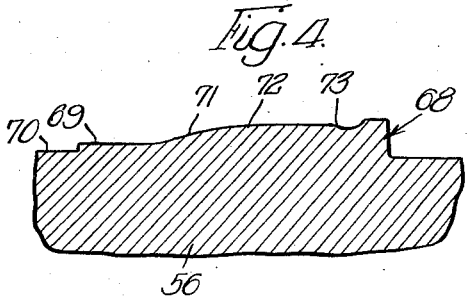
INVENTOR.
Arthur J. Warsaw,
BY
Cromwell, Grist - Warden
attys.

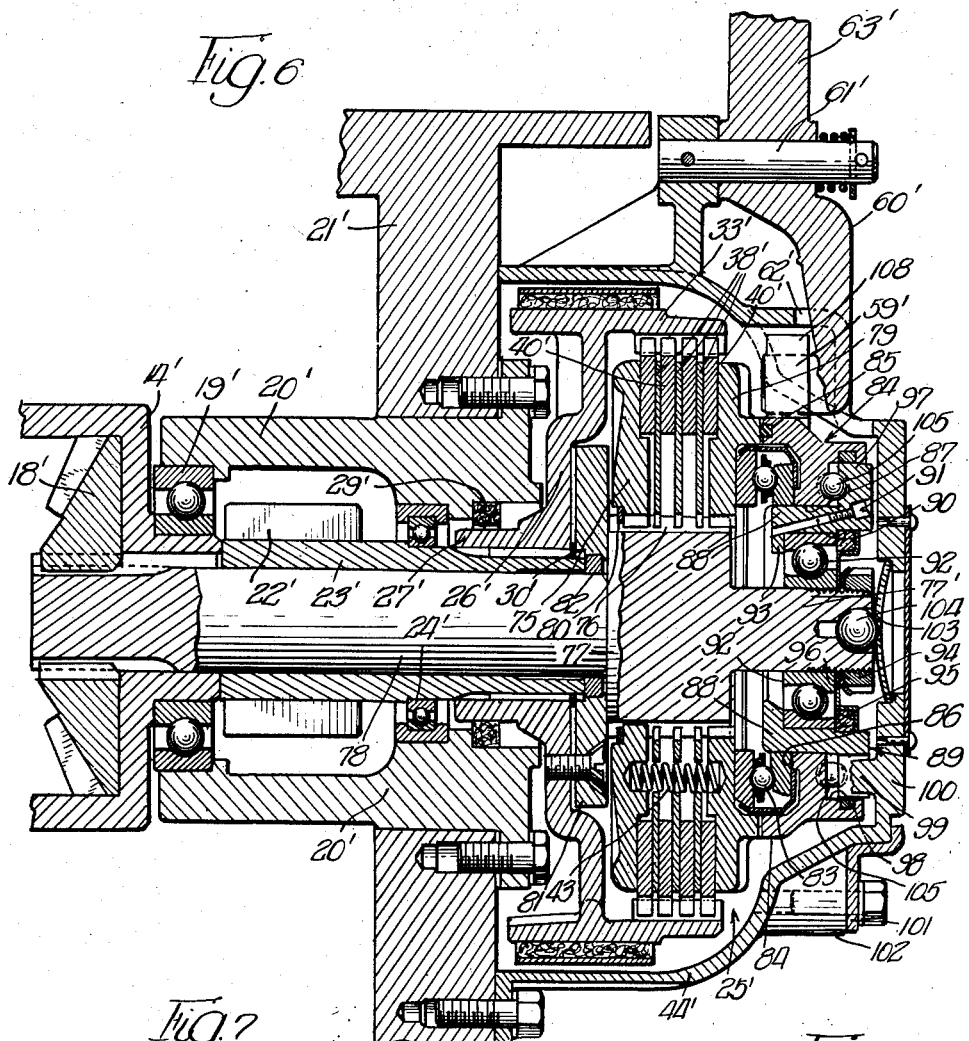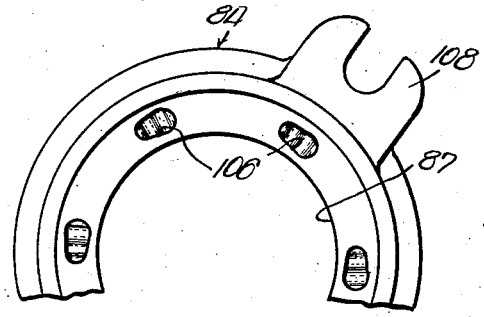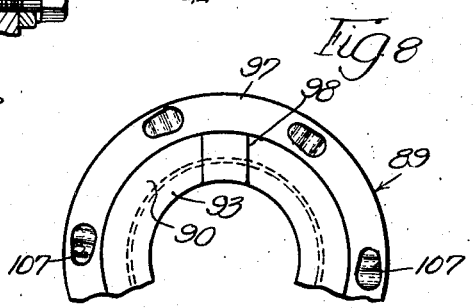

United States Patent Office 2,848,086
Patented Aug. 19, 1958

2,848,086

POWER TAKE-OFF AND TRACTOR DRIVE MECHANISM

Arthur J. Warsaw, Anchor, Ill., assignor of one-half to Ertel Manufacturing Corporation, and one-half to Elmo Meiners Application January 13, 1953, Serial No. 331,034

2 Claims. (Cl. 192—93)

The present invention pertains to an improved clutch-controlled live power take-off for the operation of auxiliary utilities driven directly from the transmission of a tractor or like transmission-controlled vehicle. It is a general purpose to provide means for the driving and control of such auxiliary equipment, as a thresher, a corn picker, etc., which functions independently of the movement of the vehicle. This permits the auxiliary device to perform to best advantage, under any and all operating conditions of terrain and type of work. The invention also deals in particular with an improved clutch disposed between a differential-driven shaft powered from a transmission, which also drives an auxiliary power take-off device, and a tractor bull pinion or equivalent tracto-motive power element.

This arrangement enables transmission of power through such traction element to be optionally interrupted or diminished to halt or decelerate motion of the vehicle as desired, without affecting the normal driving connection between the vehicle transmission and equipment directly driven by the power take-off of the latter, and accordingly with the benefit of the full or desired operating speed, capacity or efficiency of the equipment made available for the task at hand.

An improved and very compact clutch having its own self-contained thrust circuit or cycle, quite independent of the associated clutch power input or output provisions, is also an important feature of the described arrangement.

Well known makes of tractor transmission are commonly provided with an auxiliary or power take-off gear which is driven by the transmission. In one type this gear is a belt pulley gear mounted immediately inside the transmission housing, and for the sake of simplicity it will be assumed that such a gear is the power take-off gear of the present unit. However, it is to be understood that the gear in question may be located otherwise, for example at the rear of the tractor, being driven from the transmission through a front-rear shaft.

This gear has nothing to do with the operation of the transmission itself, being provided solely as a source of external power for the operation of other equipment, such as a thresher, a corn picker, a belt pulley for a power saw, etc. In order to derive power from the auxiliary gear for this purpose it is of course necessary that the transmission be engaged, the propeller shaft leading therefrom to the bull pinion shaft being driven.

The difficulties encountered in operating tractor-powered auxiliary equipment in which an auxiliary tool or utility is direct driven from the tractor transmission, without any provision for independence of action in relation to the speed of the tractor, are best understood by reference to two typical auxiliary installations. One instance is a thresher or combine operated in conjunction with the tractor, the auxiliary unit being mechanically coupled to the transmission power take-off gear.

Assuming that the operator of such a set-up is crossing a small ditch, he will in practically every instance slow the forward movement of the tractor by decelerating, shifting gear or even braking, if necessary, until the ditch is crossed. This of course correspondingly reduces the operating speed of the combine, hence its efficiency and capacity in handling grain. It is even questionable if efficiency and capacity would be saved if the ditch were to be crossed at unchanged, rapid speed, to say nothing of the attendant possibilty of damaging the tractor, the combine and/or any other equipment driven by it.

Another example is the operation of a corn picker having a tractor as its prime mover. The operator will frequently see or anticipate a heavy mass or slug of material about to enter the picker or entering the same. He may proceed with undiminished speed, chancing the possibiltiy of slugging of the mass in the machine. If this happens, he must dismount and try to untangle the slug, an operation which has cost many people the loss of a hand or other disfigurement, or death. Alternatively, the operator may slow down the tractor before the slug is encountered, but here again the operation of the corn picker is slowed correspondingly; it cannot handle the material as expeditiously or effectively at the slow rate.

To overcome this, the operator may disengage the master tractor clutch, halting the operation of everything except the tractor engine, then disengage the tractor gear shift lever and re-engage the master clutch. With the tractor and corn picker stationary, an attempt may be made to pass the material through the picker, upon which forward motion of the tractor is resumed, to be interrupted by further similar manipulations of engaging and disengaging the transmission until the excessive material is handled. It is evident that a much waste of time, plus inconvenience and annoyance, accompany the loss of productive yield inherent in this sort of operation.

It has also been proposed to drive a propeller shaft driven bull pinion and an auxiliary power take-off shaft through different gear and shafting arrangements employing two different clutches, in order to enable the wheel shaft to be halted by declutching while the motive power output shaft continues to rotate. This involves a considerable re-design of a conventional tractor transmission, as well as considerable production cost due to duplication of clutches, shafting and other power transmitting means.

An independent control of the auxiliary tool or implement can be had by inserting a clutch in its line of power from the auxiliary take-off gear of the transmission, but this simple tool de-clutching of course does not meet the problems imposed by the change in tool operating speed, which proportionately follows each change in tractor speed, assuming continuous operation of the tool is desired, as discussed above.

It is therefore an object of the invention to provide an improved, simplified and compact assembly constituting a live power take-off unit as described which may be installed in existing tractors with a minimum of alteration thereof and with a minimum of installation expense.

Furthermore, it is an object to provide a clutch controlled live power take-off rendering the speed of operation of an auxiliary tractor powered apparatus independent of the speed of movement of the tractor, which enables a clutch of minimum torque capacity to be employed, with reference to ultimate output torque at the wheel or tread axle; one reason for this is because the clutch acts in advance of a bull pinion in the line of power transmission to the wheel or tractor crawler tread, thereby accomplishing a reduction due to the tooth ratio of the pinion and a much larger bull gear driven thereby.

More specifically, it is an object of the invention to provide a live power take-off system involving a transmission having an auxiliary take-off gear operating there-with and an output traction shaft or axle, preferably powered through a differential unit from a transmission-controlled propeller shaft, the system featuring a bull pinion sleeved on an output shaft and a manually releasable clutch of improved sort which has elements drivingly connected respectively to the propeller shaft and to the bull pinion to constitute a rigid or slip driving connection to the pinion; this permits continuous transmission-driven operation of the auxiliary equipment at full speed while compensating at the differential for deceleraton or immobilization of the tractor.

A further object is to provide a live power take-off tractor installation of the above described nature featuring a clutch of very compact construction, in which the provisions for sustaining axial thrust are self-contained, being entirely independent of other associated parts.

A still further object is to provide a clutch as described in the preceding paragraph which is spring urged for decoupling and has improved rotary actuating and bearing provisions for easy hand operation of the clutch, there being a complete lack of axial thrust on any part which is occasioned by the force of clutch manipulation.

Yet another object is to provide a replacement type of power take-off unit for a tractor which retains the manually applied brake band and drum of the tractor and features an improved decoupling clutch for the tractor output shaft which is built into the brake drum. However, it should be understood that the improved construction is in all ways well adapted as an original manufacture, as well as a replacement unit.

The foregoing statements are indicative in a general way of the nature of the invention. Other and more specific objects will be apparent to those skilled in the art upon a full understanding of the construction and operation of the power take-off system and its clutch control.

Two embodiments of the invention are presented herein for purpose of illustration, but it will be appreciated that the invention may be incorporated in other modified forms coming equally within the scope of the appended claims.

In the drawings:

Fig. 1 is a fragmentary view showing the tractor driving and clutch control parts of one embodiment of the improved unit in relation to the transmission controlled propeller shaft of the vehicle, being for the most part in longitudinal axial section through the differential-driven, tractor bull pinion shaft of the same:

Fig. 2 is an end elevation of the unit with an end cover plate removed, or as viewed from line 2—2 of Fig. 1;

Fig. 3 is an inside face view of a clutch operating cam plate of the clutch unit;

Fig. 4 is an enlarged fragmentary sectional view, along the sectional pitch line 4—4 of Fig. 3, through a cam element on the plate of Fig. 3;

Fig. 5 is a fragmentary view showing schematically the operating relationship of the tractor driving and clutch control unit of Figs. 1 and 2 to a transmission including a gear adapted to drive an auxiliary power take-off installation, as contemplated by the invention;

Fig. 6 is a fragmentary view in section similar to Fig. 1 showing a modified clutch control for a unit of the general type shown in Figs. 1-5, this assembly also having self-contained thrust bearing provisions independent of associated parts;

Fig. 7 is a fragmentary end view of a rotary, ramp-type clutch actuating plate which is a part of the unit of Fig. 6; and Fig. 8 is a fragmentary end view of a fixed, ramp-type cam actuating plate which is associated with the plate of Fig. 7.

Referring to Figs. 1 and 5 of the drawings, a tractor transmission 10 is shown, including a belt pulley gear 11 which, as indicated above, will be considered the auxiliary power take-off gear of the illustrated installation. Through conventional associated gearing, shafting and the like (not shown), is adapted to drive an auxiliary tool or equipment such as a belt pulley for a saw, a thresher or combine, a corn picker, etc., the engine driven transmission acting as a prime mover. Transmissions equipped in this manner, and otherwise, are well known, hence it is not considered necessary to further illustrate or describe the same or equivalent arrangements. An example is shown in my copending application Serial No. 58,488, filed November 5, 1948. The speed controlled output shaft of transmission 10 is designated 12 and is connected, directly or through suitable coupling means (not shown), to a bevel pinion 13 meshing with a ring gear 14 (Fig. 1) which is secured to a differential bearing cage 15. Cage 15 is rotatively mounted on a tractor output or driving shaft 16, and bevel gears 17, 18 associated with the cage drive the shaft in well known, differential overrunning manner. Gear 18 is keyed to the shaft.

An axial hub on differential cage 15 is rotatively mounted by a ball bearing 19 in a tubular housing member 20 which is bolted to a suitable part 21 of the tractor. A power output member, namely tractor bull pinion 22, is located within housing member 20. Pinion 22 is provided with an integral elongated hub 23 which is rotatively sleeved on shaft 16, and the hub is also journalled by a ball bearing 24 in housing member 20. A bull gear (not shown), meshes with pinion 22 through a relatively small opening (not shown) in housing 20, in a known manner.

The reference numeral 25 generally designates a multiple disk type clutch of improved, self-contained thrust cycle design. This clutch internally absorbs all axial load in its operation to control bull pinion 22; no thrust whatsoever is imposed on the pinion, on cage 15, on bearings 19, 24 or on any other part which may be a component of an existing tractor power output system. Thus clutch 25 can be installed on an existing tractor to convert the same for live power take-off, as contemplated by the invention, with a minimum of change-over expense, insofar as special or extra parts or labor are concerned.

Clutch 25 includes an outer braking drum 26 having an axially extending hub 27 which is sleeved on bull pinion hub 23 and is drivingly connected thereto by splines 28. Suitable packing rings or oil seals 29 are interposed between hub 27 and housing member 20 to seal lubricant and exclude dirt, and known provisions may be made to lubricate and/or drain the unit in this zone.

A split snap ring 30 holds the drum axially in place on bull pinion hub 23, with its own hub abutting the inner race of ball bearing 24. A packing 31 seals the drum hub relative to shaft 16.

A radially extending clutch backing plate 32 is axially housed within an outer, axially extending brake flange portion 33 of drum 26, and is secured in rotatively fixed relation to shaft 16 by means of a plurality of keys 34. Snap rings 35, 35' hold an integral, axially extending hub 36 on backing plate 32 in axially fixed relation to shaft 16, ring 35 serving as an essential thrust abutment for the clutch, as will be described.

Backing plate hub 36 is provided with external, axially extending splines 37 which are engaged by teeth on radially extending clutch disks 38, thus mounting the disks in axially slidable but rotatively fixed relation to plate 32. A clutch end pressure plate 39 is similarly engaged with splines 37. Other clutch disks 40 alternate with disks 38 between the clutch backing and pressure plates 32, 29, in well known fashion, and are provided with outer peripheral teeth which have axially slidable but rotatively fixed engagement with axially extending splines 41 on the internal peripheral surface of brake drum flange 33. The intermediate clutch disks 38 are provided with axially aligned apertures which receive coil compression springs 43. These act against backing and pressure plates 32, 38 in a direction to separate the same and thereby urge the clutch to uncoupled condition. The number of clutch disks 38, 40 is chosen as desired, the primary consideration in this regard being the problem of heat dissipation; the axial load factor is comparatively mild.

A brake band 42 encircles brake flange 33 on drum 26. It is adapted to be radially constricted to slow rotation of the drum by any suitable brake actuating linkage, operated by a separate hand lever in a well known fashion. It has not been deemed necessary to illustrate conventional mechanism of this sort, and the brake band 42, plus a brake actuating shaft 42' (Fig. 2) may therefore be considered to represent generally a suitable drum braking device.

All of the above described clutch structure, plus other thrust bearing and actuating provisions therefor to be described, is contained within an auxiliary housing 44 bolted to an external surface of the tractor or its frame 21. This housing has an outwardly flanged end opening 45 coaxial with shaft 16, into which the outer end of shaft 16 extends, the material defining the opening being provided with suitable radially inwardly offset locking lugs 46 (see Fig. 2). These are keyed in locking recesses 47 in an annular clutch end thrust plate 48 to hold the same against rotation. Plate 48 is of cup-like cross sectional outline, being centrally apertured at 49 to receive the reduced diameter end 50 of shaft 16 which is rotatively journaled in by ball bearing 51 in the cupped interior of plate 48. Bearing 51, it should be particularly noted, is a special end thrust absorbing type, which is its primary function. Its inner race backs against and is axially held in place by an adjusting ring 52 threaded on the end of reduced shaft extension 50. The outer race of bearing 51 axially abuts plate 48.

Cup-like clutch end thrust plate 48 carries a radially and axially thickened bearing mounting flange portion 53. This is axially slotted at 120° intervals to receive three clutch actuating and bearing rollers 54, which are rotatively mounted by means of radially extending pins 55. Bearing rollers 54 coact with a clutch actuating cam plate which is generally designated by the reference numeral 56, details thereof being illustrated in Figs. 3 and 4 of the drawings.

Plate 56 is of annular, centrally apertured outline, the central aperture 57 thereof receiving the inner portion of cup-like end thrust plate 48. It carries a radially extending, forked actuating arm 58 which, as illustrated in Figs. 1 and 2, receives an inwardly extending actuating lug 59 on an actuating lever 60 which is pivotally mounted at 61 upon housing 44. Lever 60 is disposed externally of the housing, the actuating lug 59 extending inwardly through an arcuate slot 62 formed in the housing to receive the same. An integral operating extension 63 of lever 60 extends upwardly for convenient manipulation by the operator.

The inner surface of annular clutch cam plate 56, i. e. the surface facing pressure plate 39, is axially counterbored at 64 to receive an end thrust roller bearing 65 which engages plate 39. The inner face of plate 56 is also provided with an annular groove somewhat outwardly of the counterbore which receives a compressible packing 66. Plate 39 slidably engages against packing 66 to seal the bearing in this zone.

The rear or outer surface of clutch actuating cam plate 56 is provided, at 120° intervals and in approximate axial register with the respective bearing rollers 54 on end plate 48, with three actuating cams 68 of arcuate shape (Fig. 3) which bear against those rollers. These cams are arranged in circumferential alignment and may be machined integral with the plate. Referring to Figs. 3 and 4, each cam 68 comprises a flat, radially extending, neutral or clutch release land 69 at one circumferential end thereof, this land being elevated somewhat with reference to the remainder of the adjacent surface 70 of plate 56. Land 69 merges with a primary cam rise 71 of relatively sharp or distinct inclination, relative to the flat land, and rise 71 in turn merges into a secondary rise 72. This is of substantially milder inclination than rise 71, being little more than parallel with land 69. Assuming that the primary rise 71 takes an axial elevation of .080 inch above land 69 in a circumferential space of 5/16 inch, the secondary rise will pitch axially only a further lift of .010 inch in twice that circumferential space. Secondary rise 72 leads to a holding drop or low 73 which is, say, .003 inch beneath the rear or high point of rise 72. The cam bearing rollers 54 come to rest and remain in the respective terminal lows 73 when clutch 25 is fully engaged. When the clutch is fully disengaged or decoupled, rollers 54 will rest on flats 69.

In the operation of the above described system, when the operating extension 63 of lever 60 is moved fully forward, i. e. counterclockwise about pivot 61 or to the left as indicated by arrow in Fig. 2, the cams 68 on plate 56 are shifted beneath bearing rollers 54 to bring the terminal low 73 of each cam to receiving register with a roller. This actuates and holds clutch 25 in a fully engaged condition, clutch disks 38, 40 being fully compressed between backing and pressure plates 32, 39, with the thrust bearings fully loaded. The system as a whole is in a 1:1 drive ratio. The tractor is propelled and the auxiliary tool or equipment is powered from auxiliary take-off gear 11 of the transmission 10 at whatever speed the latter is set for.

Assuming that auxiliary equipment, such as a thresher or corn picker previously instanced is appropriately connected for drive by the transmission auxiliary power take-off gear 11. Clutch 25 is fully engaged with rollers 54 resting in cam lows 73. If a ditch, or like declivity or rough terrain, is approached across which it is desired to proceed at reduced speed, yet without loss of operating efficiency of the thresher, or if a heavy slug of material is seen to be about to enter the corn picker, all that the operator need do is to slow the speed of the tractor by manipulating operator lever 63 clockwise (Fig. 2). This may involve only a partial shift of the lever, sufficient only to cause the cams 68 to ride down onto their secondary rises 72, partially disengaging clutch 25 for a semi-positive, partial slip drive therethrough. Reduced speed may be continued until the tractor and thresher have crossed the obstacle or declivity, or until the corn picker has handled the slug without exceeding its capacity. In either case, the auxiliary equipment operates independently of tractor travel, so that the load thereon may be controlled simply by manipulating the tractor's speed.

In the event a very heavy load is encountered such as a large slug of material entering a corn picker, the tractor may be further retarded or completely halted by manipulating the operating lever to bring relatively sharp primary cam rises 71 into engagement with bearing rollers 54, or until the rollers are engaged with the neutral flats or lands 69 of the respective cams. This completely disengages clutch 25 and halts the tractor, the rotation of transmission output or propeller shaft 12 being fully compensated at the differential unit 15. When the overload has been digested, tractor speed may be resumed as desired.

It will be noted that the torque load on clutch 25 is kept within reasonable bounds by associating the same with the bull pinion shift 16, rather than directly on the rear axle of a wheel or track driver, which axle is driven by a bull gear from bull pinion 22. A benefit of one reduction is thereby availed of, due to the substantial pinion-gear tooth ratio. A relatively light capacity clutch may be employed, the number and area of disks being primarily determined on the basis of heat dissipative capacity.

Clutch 25 is an entirely self-contained one in respect to its thrust cycle or circuit. Referring to Fig. 1 it is seen that thrust ball bearing 51 bases axially on shaft 16, abutting against shaft-secured adjusting ring 52. The circuit of thrust from this base of support is through bearing 51, end plate 48, cam rollers 54, cam plate 56, ball bearing 65, clutch pressure plate 39, clutch disks 38, 40, clutch backing plate 32, and snap ring 35 back to shaft 16. Everything on either axial side of this compact group of parts is without thrust load of any sort in the operation of the clutch.

The parts of the clutch are simple for low cost production, yet well suited for best operation both at minimum and maximum axial thrust load. An absolute minimum of replacement of existing tractor shafting and bearings is required in converting to the improved live power take-off by installing clutch 25. It is readily seen to be very small, compact and light in weight. With the same objectives of minimim cost of manufacture and installation on existing tractor designs, the system as a whole presents a further substantial manufacturing economy, since it involves the use of but a single tractive power throw out clutch to provide auxiliary tool operation independent of vehicle speed.

A slightly modified embodiment of the power take-off unit and control clutch is illustrated in Figs. 6, 7 and 8 of the drawings. In many respects, this unit is very similar to the embodiment illustrated in Figs. 1 through 4; hence corresponding reference numerals, primed, will be employed to designate corresponding, similarly functioning parts. In the interest of brevity, further description of these corresponding parts or relationships will be omitted.

Modified clutch unit 25' has an annular, axially fixed backing plate 75 which is internally splined at 76 on an integral enlargement 77 of a transmission and differential driven output shaft, here designated 78. Axially slidable clutch pressure plate 79 is similarly splined on the enlargement, as are the intervening clutch disks 38'. Alternate clutch disks 40' are externally splined on the interior of the flange 33' of a clutch and braking drum 26'. As in the first described embodiment, the hub 27' of drum 26' is keyed to the hub 23' of bull pinion 22', a packing or oil seal 29' being interposed between the drum hub and housing member 20'. Clutch pressure plate 75 is axially sustained on shaft enlargement 77 by a split snap ring 80, and this snap ring constitutes the left hand thrust absorbing abutment of clutch 25', transferring axial load from pressure plate 75 to shaft 78. An internal annular end plate 81 is bolted to the radial flange of drum 26', being disposed immediately to the left of the shaft enlargement 77, and a packing or O-ring 82 between the inner periphery of this ring and shaft 78 serves to seal the left hand side of the clutch space. Drum 26' is held in place on shaft 78 by a snap ring between its radial flange and plate 81.

Clutch pressure plate 79 is sustained rearwardly by an axial thrust receiving ball bearing 83, the left hand race of this bearing being disposed in a shallow rear recess of pressure plate 79 and the right hand race being disposed in a similar recess in the inner, left hand face of a rotatively adjustable clutch actuating plate, generally designated 84. This plate has an annular, inner face groove receiving a packing ring 85 for sliding sealing engagement with a rear surface on pressure plate 79. Axial thrust bearing 83 rearwardly abuts an inwardly facing surface 86 on clutch actuating plate 84.

The annular bore 87 of rotatively adjustable plate 84 telescopingly receives the inner, axially cupped end 88 of a stationary clutch actuating plate of annular shape which is generally designated by the reference numeral 89. The right hand race of bearing 83 is sleeved over plate cup portion 88. One or more oil holes 90 are drilled through plate 88 for the lubrication of the clutch and bearing components; these openings being normally sealed from the exterior by a plugging screw 91.

Stationary plate 89 receives, in its cupped interior, a ball bearing 92. This, though shown as a radial type, has as its primary function the reception and transmission of axial thrust. Its outer race axially abuts a relatively narrow radial flange 93 on plate 89, and its inner race is in axially abutting and rearwardly sustained relation, to an adjusting ring 94 which is threaded on an outer, reduced diameter end extension of shaft enlargement 77, designated 77'. An annular packing 95 is clamped in the interior of plate 89 by means of a shaped annular disk 96, for the purpose of sealing clutch unit 25' against the entry of dust and dirt and to hold in lubricant.

The problem of containing lubricant and sealing against dirt is a major one in a unit of the sort under consideration. Therefore I have coupled sealing provisions with a provision for holding the stationary cam actuating plate 89 in fixed relation to housing 44, to the end that clutch 25' cannot be operated until its interior is fully sealed. A radially extending, axially thickened flange 97 integral with ring 89 is provided with an axially extending locking slot 98 in its periphery, or with plurality of such slots. This receives a forwardly projecting, similarly shaped locking lug 99 integral with an annular rear closure plate 100. Plate 100 is held in place against the outer end of housing 44' by means of a plurality of clips 101 which are bolted to bosses 102 on the housing. An inwardly convex, light weight spring disk 103 closes the central aperture of plate 100, bearing with slight axial pressure against a ball 104 disposed in the end of reduced shaft extension 77'.

Clutch balls 105 are disposed between rotatively adjustable and fixed clutch actuating plates 84, 89, respectively. As illustrated in Figs. 7 and 8, the plates are of the inclined ramp type, plate 84 being provided with a series of circumferentially spaced, circumferentially tapered ramp depressions 106, and plate 89 having a similar series of ramp depressions 107, in similar circumferential spacing at a like radius. The contour of the ramp surfaces is the same as that of the cams 68 of the first embodiment, depicted in Fig. 4. The arrangement of the ramps 106, 107 is such that when the plates 84, 89 are opposed to one another, the ramp inclinations are oppositely disposed, whereby thrust balls 105 will be quickly brought to the desired degree of clutch actuating operation upon rotation of plate 84. This is accomplished, as in the first described embodiment of the invention, by means of a radially extending fork 108 integral with plate 84, which fork is engaged by an inwardly projecting lug 59' on actuating lever 60', as previously described.

Due to the provisions described, clutch 25', in the event of dismantling thereof, cannot be re-assembled to operating condition until end closure plate 100 is applied to housing 44' to seal its interior. The reason for this is that it is essential to clutch operation that the rear annular thrust plate 89 be held against rotation, a function of locking lug 99 on the plate 100. Hence plate 100 must be in place on housing 44' in order to perform this function.

Operation of the clutch 25' is exactly the same so far as the necessary manipulation is concerned, as in the clutch 25 of the installation shown in Figs. 1 through 4. Control of the tractor, to permit operation of a transmission-powered auxiliary tool or implement independent of the speed of forward motion of the tractor, is also exactly the same.

Clutch 25' is both structurally and functionally self-contained and self-sufficient in its thrust sustaining and transmitting function. Its axial thrust circuit or cycle originates at the fixed, though axially adjustable, end ring 94 on the shaft end extension 77', then proceeds through axial thrust bearing 92, fixed cam actuating plate 89, rotatively adjustable cam actuating plate 84, thrust bearing 83, clutch pressure plate 79, clutch disks 38', 40', clutch backing plate 78, and thrust absorbing snap ring 80, thence to the shaft enlargement 77 integral with shaft end extension 77'. As in the first embodiment, clutch 25' is actuated and de-actuated without the imposition of the slightest axial load on bull pinion 22' or planetary cage 14', or any of the radial bearing or fluid sealing provisions associated with these parts. Conversion of an existing tractor to the live power take-off operation of the invention is very simple and inexpensive, indeed, accomplished with a minimum of additional parts and retaining most of the output shafting and bearings of the tractor in question. Clutch 25' is very simple and compact, and may be designed and used in just as low a torque transmitting capacity as is consistent with required capacity to dissipate heat in operation.

In the claims to follow the term "transmission direct-driven shaft" is employed to identify the shaft 16 as one which is driven from transmission 10 in a positive fashion when the transmission is operating to transmit power through its take-off gear 11 or equivalent, and when bull pinion 22 is also operating to forward tractive power to a wheel or track driver axle. The same is true of the term "direct driven" as applied to power take-off gear 11. This signifies no interpositioning or intervention of a control member such as a clutch in the line of power transmission from transmission 10, shaft 16 or gear 11. Of course, under the conditions noted, i. e. driving operation of the auxiliary transmission take-off member 11 independently of bull pinion 22 or equivalent traction imparting member, the differential 15 is but a part of the direct driving connection between the transmission and shaft 16; in the broadest view of the invention differential action is not absolutely necessary for acceptable operation of the system.

It is to be noted, in both embodiments, that by operating the clutch through the agency of relatively rotatable cam and bearing plates, to which actuating force is applied in a plane at 90° to the clutch disk axis, I avoid the imposition of any portion of that actuating force on the unit. Maximum life and efficiency of the latter are thus further promoted.

I claim:

1. A clutch construction to releasably couple a pair of coaxial rotary and relatively rotatable power input and output members, comprising a clutch backing plate, means fixedly anchoring the same relative to one of said members, a clutch pressure plate in fixedly rotative and axially slidable relation to said one of said members, clutch elements compressible between said plates and mounted in axially slidable, fixedly rotative relation to the other member, an axial thrust sustaining abutment adjustable on but normally in axially fixed relation to said one of said members, and axial thrust transmitting means including coacting fixed and relatively rotatable clutch actuating cam members disposed between said clutch pressure plate and said thrust sustaining abutment, whereby the abutment and said anchored backing plate acting directly through said one of said first named members, complete the thrust cycle of said plates, clutch elements and thrust transmitting means, said clutch plates, clutch elements, thrust transmitting means and abutment being mounted in a housing having an external sealing member, which sealing member has means releasably keying the same in rotation-preventing relation to said fixed cam actuating member.

2. A clutch construction to releasably couple a pair of coaxial rotary and relatively rotatable power input and output members, comprising a backing plate, means to secure and support the same in axially fixed non-rotative relation to one of said members, a pressure plate in non-rotative but axially slidable relation to said one of said members, clutch elements compressible between said plates and mounted in axially slidable non-rotative relation to the other member, an axial thrust sustaining abutment adjustable on but normally in axially fixed relation to said one of said members, and axial thrust transmitting means including coacting fixed and relatively rotatable clutch actuating cam plate members disposed between said clutch pressure plate and said thrust sustaining abutment, whereby the abutment and said anchored backing plate acting directly through one of said first named members complete the thrust cycle of said plates, clutch elements and thrust transmitting means, said respective cam plate members having circumferentially spaced oppositely inclined actuating ramps and thrust balls in rolling engagement with said ramps, said clutch plates, clutch elements, thrust transmitting means and abutment being mounted in a housing having an external sealing member, which sealing member has means releasably keying the same in rotation-preventing relation to said fixed cam plate member.

References Cited in the file of this patent

UNITED STATES PATENTS

| | | |
|---|---|---|
| 1,374,947 | Newhouse | Apr. 19, 1921 |
| 1,438,486 | Gorman | Dec. 12, 1922 |
| 1,620,868 | Burger | Mar. 15, 1927 |
| 1,827,655 | Haubert | Oct. 13, 1931 |
| 2,214,805 | Baker | Sept. 17, 1940 |
| 2,314,664 | Shenstone | Mar. 23, 1943 |
| 2,536,737 | Gerst | Jan. 2, 1951 |
| 2,591,873 | Risk | Apr. 8, 1952 |
| 2,605,653 | Banker | Aug. 5, 1952 |
| 2,632,539 | Black | Mar. 24, 1953 |
| 2,661,826 | Hendrickson | Dec. 8, 1953 |
| 2,679,769 | Parrett | June 1, 1954 |

FOREIGN PATENTS

| | | |
|---|---|---|
| 119,058 | Great Britain | Sept. 16, 1918 |